(12) United States Patent
Sandrini et al.

(10) Patent No.: US 7,341,196 B2
(45) Date of Patent: Mar. 11, 2008

(54) LOCATION IDENTIFICATION OF MACHINE-READABLE DATA EMBEDDED IN DATA CARRIERS

(75) Inventors: Marco Sandrini, Helsinki (FI); Martin Zilliacus, Kauniainen (FI)

(73) Assignee: Nokia Corporation, Espoo (FI)

( * ) Notice: Subject to any disclaimer, the term of this patent is extended or adjusted under 35 U.S.C. 154(b) by 372 days.

(21) Appl. No.: 11/023,732

(22) Filed: Dec. 28, 2004

(65) Prior Publication Data

US 2006/0138242 A1    Jun. 29, 2006

(51) Int. Cl.
*G06K 19/00* (2006.01)
(52) U.S. Cl. .................. 235/487; 235/492; 235/375
(58) Field of Classification Search ............. 235/487, 235/492, 494, 380, 375, 382
See application file for complete search history.

(56) References Cited

U.S. PATENT DOCUMENTS 6,250,549 B1 * 6/2001 DeFabio, Jr. ............... 235/380

6,325,292 B1 * 12/2001 Sehr ........................ 235/492
2005/0018873 A1 * 1/2005 Rhoads ..................... 382/100

OTHER PUBLICATIONS

Moira C. Norrie, Beat Signer; *Switching Over to Paper: A New Web Channel*; Fourth International Conference on Web Information Systems Engineering (WISE'03); Dec. 2003; 10 pages; IEEE 2003.
Paul Luff, Christian Heath, Moira Norrie, Beat Signer, Peter Herdman; *Only Touching the Surface: Creating Affinities Between Digital Content and Paper*; Conference on Computer Supported Cooperative Work, Chicago, Illinois; Nov. 2004; pp. 523-532; vol. 6, Issue 3; ACM 2004.

* cited by examiner

Primary Examiner—Karl D. Frech
(74) Attorney, Agent, or Firm—Alston & Bird LLP

(57) ABSTRACT

The invention provides location identification of machine-readable data on data carriers. The invention is able to provide identification of the location of the machine-readable data without the need to provide a separate visual symbol or logo within the data carrier. As such, the present invention provides location indication without having to occupy additional space within the data carrier. The invention accomplishes these attributes by systematically associating the machine-readable data with a predefined portion of the visually perceptible information that is included within the data carrier.

34 Claims, 5 Drawing Sheets

LOCATION IDENTIFICATION OF MACHINE-READABLE DATA EMBEDDED IN DATA CARRIERS

FIELD OF THE INVENTION

The present invention relates to machine-readable data and, more specifically to methods, systems and devices for identify the location of machine-readable data embedded in data carriers.

BACKGROUND OF THE INVENTION

Machine-readable data has becoming more common in every facet of life though usage of visual machine-readable symbologies, such bar codes and the like, non-visual machine-readable radio frequency identification (RFID) tags and other forms of short range communication techniques. Such forms of machine-readable data have commonly been used as a means of providing pricing for consumer goods, inventory control for commercial and non-commercial goods, security identification for individuals and the like. Typically, in the past, the use of such machine-readable data has been somewhat limited by many factors, including but not limited to, cost of producing the machine-readable data, for example an RFID tag, the limited amount of data that can be associated with a code/tag and other factors.

However, recent innovations have made it possible to produce both visual and non-visual symbologies through cost-effective printing means. For example, use of ultraviolet (UV), magnetic and conductive inks have recently been implemented resulting in a cost-effective means for producing non-visible machine-readable data. In addition, the amount of data that can be associated with a tag/code is no longer limited by the memory capacity of the code or tag. For example, linking applications have been developed which provide for the machine-readable data to include a network link, such as an Internet link to additional information that is connected to the code or tag information.

In addition to improvements in the machine-readable data tags, more and more devices are being introduced into the marketplace that have the capability to read machine-readable data. This is especially evident in the area of mobile terminals, such as mobile telephones, personal data assistants (PDAs) and the like. By providing for such readers in mobile terminals it enhances their overall functionality and allows for read data to be automatically inputted into other applications executed on the device (i.e., capturing contact information and automatically transferring it to a telephone book application). Many mobile terminals are already equipped with digital cameras that provide the ability to capture images and, in some instances, are additionally equipped with applications that provide machine-readable reading functionality. With the use of mobile terminals becoming prominent in society, the machine-readable data reader functionality will allow all such device users to readily acquire and store all sorts of information from machine-readable data (i.e., codes, tags and the like).

Recent technological advancements have made it possible for embedding information in printed media, such as books, periodicals and other forms of printed media. For a teaching that provides for combining printed media with machine-readable data, see the published article entitled, "In Bridging the Paper and Electronic Worlds: The Paper User Interface", Johnson et al., 1993, which describes methods for embedding diagonal marks, "glyphs" or the like into documents. The embedded information may typically include linking data that allows the capturing device or a device associated with the capturing device to connect to Internet data or services. For example, machine-readable data embedded in an advertisement or promotion may provide linking information to the product's Internet web-site. See for example, U.S. Pat. No. 5,933,829, entitled "Automatic access of electronic information through secure machine-readable codes on printed documents", issued Aug. 3, 1999, in the name of inventors Durst et al., which provides methods for printing articles and advertisements with barcodes having an Internet file reference printed in the barcode. In addition, see U.S. Pat. No. 6,314,457, entitled "Method for managing printed medium activated revenue sharing domain name system schemas", issued Nov. 6, 2001, in the name of inventors Schena et al., which describe the core technology surrounding SmartCodes™ (a trademark of AirClic Incorporated of Newton, Pa., USA) that code intrinsic codes or data into machine-readable (e.g., barcodes) form or human readable (e.g., numbers) form. Using the number or the bar code, more information can be retrieved or some added functionality can be initiated.

The embedded information may take the form of visibly identifiable data, such as visual symbologies like bar codes and the like and invisible data, such as glyphs, watermarks, UV/magnetic/conductive inks and the like. Invisible or hidden embedded data in printed media has been successfully deployed for copyright protection and authenticity purposes. See for example, U.S. Pat. No. 5,768,426, entitled "Graphics Processing System Employing Embedded Code Signals", issued on Jun. 16, 1998 in the name of inventor Rhoads, which teaches a steganographic method for encoding a data signal into a two-dimensional image and the corresponding decode process.

When visible machine-readable data, such as barcodes and the like, is implemented in printed media, the data itself is easily identifiable to the reader and, as such, the reader knows exactly where to scan (i.e., direct their reading device) to capture the data. However, if the machine-readable data is invisible, the reader, typically a consumer, has no way of knowing that such embedded data exists without being provided some visual indication that machine-readable data is invisibly embedded in the media. Typically, a visual symbol may be used to indicate that the page, article, advertisement or the like included machine-readable data. However, the use of a visual symbol obviates the benefit realized by using invisible machine-readable data, i.e., the visual symbol uses up valuable page or advertisement space in the printed media. In addition, the inclusion of a visual symbol, in the form of a logo or the like, may present problems in terms of gratuitous promotion of the invisible machine-readable data, i.e., the brand of invisible code/tag that is being implemented.

Thus a need exists to develop systems, devices and corresponding methods that notify the readers of printed media that non-visual embedded machine-readable data exists within the printed data and provides an indication as to where, within the printed media, the machine-readable data is located. In addition, if the machine-readable data is parsed into more than one capture-able segment, the desired system, device and method should provide for a systematic means for capturing such data in necessary sequential order, so that the data is useful to the user of the capturing device. The desired system, device and methods should be cost-efficient to implement and, as such, utilize existing methods for invisibly embedding data in print media.

BRIEF SUMMARY OF THE INVENTION

The present invention provides for methods, systems and devices for providing location identification of machine-readable data on data carriers. The invention is able to provide identification of the location of the machine-readable data without the need to provide a separate visual symbol or logo within the data carrier. As such, the present invention provides location indication without having to occupy additional space within the data carrier. The invention accomplishes these attributes by systematically associating the machine-readable data with a predefined portion of the visually perceptible information that is included within the data carrier. For example if the data carrier is embodied as print media (i.e., a newspaper, a magazine or the like), the visually perceptible information may be textual article or an image and the corresponding predefined portion may be the header of the article or a caption of the image. The user of a reader device will be able to recognize that if machine-readable data exists, it will be located within these predefined portions and the user will aim/direct the reader device at these portions in order to read/capture the data. Additionally, the predefined portions may include an identifier that identifies the portion as including machine-readable data. The identifier will be embodied within the visually perceptible information, such that it does not take the form of a separate visual symbol or logo.

In one embodiment of the invention a data carrier device that provided indication of machine-readable data within the data carrier is defined. The device will include a visually perceptible information field that includes visually perceptible information and machine-readable data that is associated with a predefined portion of the visually perceptible information field. The machine-readable data may be subimposed, superimposed, interlaced or otherwise associated with the visually perceptible information.

The data carrier may take the form of any object that is suitable for including visually perceptible information. For example, in one specific embodiment the data carrier may be print media, such as a newspaper, a magazine, a book or the like.

The visually perceptible information may include human-readable information, (i.e., text content or the like), a visual image (i.e., a photograph or the like) or any other information that is visually perceptible. In one specific embodiment in which the visually perceptible information is human-readable information the predefined portion of the field that includes the associated machine-readable data may be a header portion. For example, the header portion of a magazine article, a newspaper article or an advertisement. In another specific embodiment in which the visually perceptible information is a visual image the predefined portion of the field that includes the associated machine-readable data may be a caption portion. For example, the caption portion of an illustration, a photograph or a chart depicted in a newspaper, magazine or the like.

The machine-readable data may be further defined as machine-readable code, and more specifically, visually imperceptible (i.e., invisible) machine-readable code. The machine-readable code may include one-dimensional codes, i.e., linear, such Universal Product Code (UPC), Code 128 or the like, or the code may be two-dimensional in nature, such as DataMatrix, MaxiCode, Quick Response (QR) code or the like. The invisible aspect of the machine-readable code may be realized by using an appropriate ink to form the code, such as a conductive ink, an ultraviolet ink, a magnetic ink or the like. In addition to codes, the machine-readable data may include other forms of short-range communication mediums such as Radio Frequency Identification (RFID) tags or the like.

The predefined portion of the visually perceptible information field may include multiple machine-readable data of different data codes/types. This allows the data to be read by users equipped with different reader devices. The different data codes types may include, but are not limited to, linear bar-codes, such as UPC, Code 128 or the like, two-dimensional bar codes, such as DataMatrix, MaxiCode, Quick Response (QR) code or the like, infrared, conductive, ultraviolet or the like.

The predefined portion of the visually perceptible information field will typically also include a visually perceptible indicator. The indicator will indicate that that machine-readable data is associated within the predefined portion. In this regard, the indicator provides the user of a reader device knowledge that the predefined portion includes invisible machine-readable data, i.e., code, tag or the like, that the user may desire reading/capturing. The indicator may be a predefined font type of text existing in the predefined portion, the color of the information in the predefined portion, a pattern within the characters/text of the predefined portion, a predefined border surrounding the predefined portion or the like.

In embodiments in which the machine-readable data includes multiple data units, i.e., multiple codes, multiple RFID tags or the like, the data units will be arranged in a predefined pattern to provide for ordered reading/capturing of the data by a reader. In one embodiment, the predefined pattern is defined by the orientation of the information that is superimposed on the machine-readable data. For example if the information is human-readable text arranged in columns, then the associated human-readable data units will be arranged in a similar pattern, allowing the user of the reader device to maneuver the reader as if the were visually reading the text in the predefined portion of the visually perceptible information field.

The invention is additionally embodied in a system for identifying and capturing machine-readable data. The system includes a machine-readable data reader device and a data carrier that includes a visually perceptible information field and at least one machine-readable data that is associated with a predefined portion of the visually perceptible information field. A user of the reader device will identify the predefined portion of the visually perceptible field as the portion to which requires the reader device to be aimed in order to capture the machine-readable data.

The machine-readable data reader device may be incorporated in a mobile terminal, such as mobile telephone, a digital camera, a personal digital assistant (PDA) or the like. The reader device will typically be equipped with the applications necessary to capture and decode the corresponding machine-readable data located on the data carrier. For example, if the machine-readable data is bar code data, the reader device will be capable of reading barcode data; likewise if the machine-readable data is a RFID tag, the reader device will be capable of reading RFID data.

The invention is also embodied in a method for manufacturing the machine-readable data on a data carrier. The method includes the steps of providing a data carrier, disposing machine-readable data on the data carrier and disposing visually perceptible information on the data carrier. The visually perceptible information is disposed such that it superimposes the machine-readable-data at a predefined portion of the visually perceptible information.

The data carrier that is provided may be and suitable object for including visually perceptible information. For example, in one specific embodiment the data carrier may be print media, such as a newspaper, a magazine, a book or the like.

The step of disposing machine-readable data on the data carrier may further be defined as printing an ultraviolet ink, magnetic ink, conductive ink or any other suitable material on the predefined portion to form machine-readable data.

The step of disposing visually perceptible information on the data carrier may be further defined as disposing human-readable (i.e., text or the like) or a visual image (i.e., illustration, photograph or the like) on the data carrier. The predefined portion of the visually perceptible information may be defined as a header portion of human-readable information, the caption portion of visual image information or the like.

The method may further comprise the step of providing an indication within the predefined portion of the visually perceptible information. The indication indicates that machine-readable data is associated with the predefined portion of the visually perceptible information. The indication that is provided may include, but is not limited to, the predefined font type of text, a predefined color of the information, a predefined pattern of the information, a predefined identifiable portion border or the like.

Another embodiment of the invention is defined by a method for identifying and capturing machine-readable data. The method includes the steps of recognizing an identifying characteristic associated with a portion of visually perceptible information, directing a reader device at the portion of the visually perceptible information based on recognition of the identifying characteristic and capturing a machine-readable data that is associated with the portion of the visually perceptible information. The machine-readable data may be a visually imperceptible code, such as a barcode or the like, or the data may be a short-range communication tag, such as an RFID tag or the like.

The step of recognizing an identifying characteristic associated with a portion of visually perceptible information further comprises recognizing an identifying characteristic associated with a header portion of textual information, such as a print media news article or the like or an identifying characteristic associated with a caption portion of visual image information, such as an illustration or photograph. The identifying characteristic may include, but is not limited to, a predefined font type associated with a portion of the visually perceptible information, a predefined font color associated with a portion of the visually perceptible information, a predefined pattern associated with a portion of the visually perceptible information, a predefined border associated with a portion of visually perceptible information or the like.

The method may further include the step of maneuvering the reader to follow the orientation of information associated with the portion of visually perceptible information in order to capture a plurality of machine-readable data. For example in the information is text arranged in column format, the reader will be maneuvered across the text in column-by-column fashion.

Thus, the present invention provides systems, devices and methods for providing location identification of machine-readable data on data carriers. The invention is able to provide identification of the location of the machine-readable data without the need to provide a separate visual symbol or logo within the data carrier. As such, the present invention provides location indication without having to occupy additional space within the data carrier. The invention accomplishes these attributes by systematically associating the machine-readable data with a predefined portion of the visually perceptible information that is included within the data carrier.

BRIEF DESCRIPTION OF THE DRAWINGS

Figure 1:
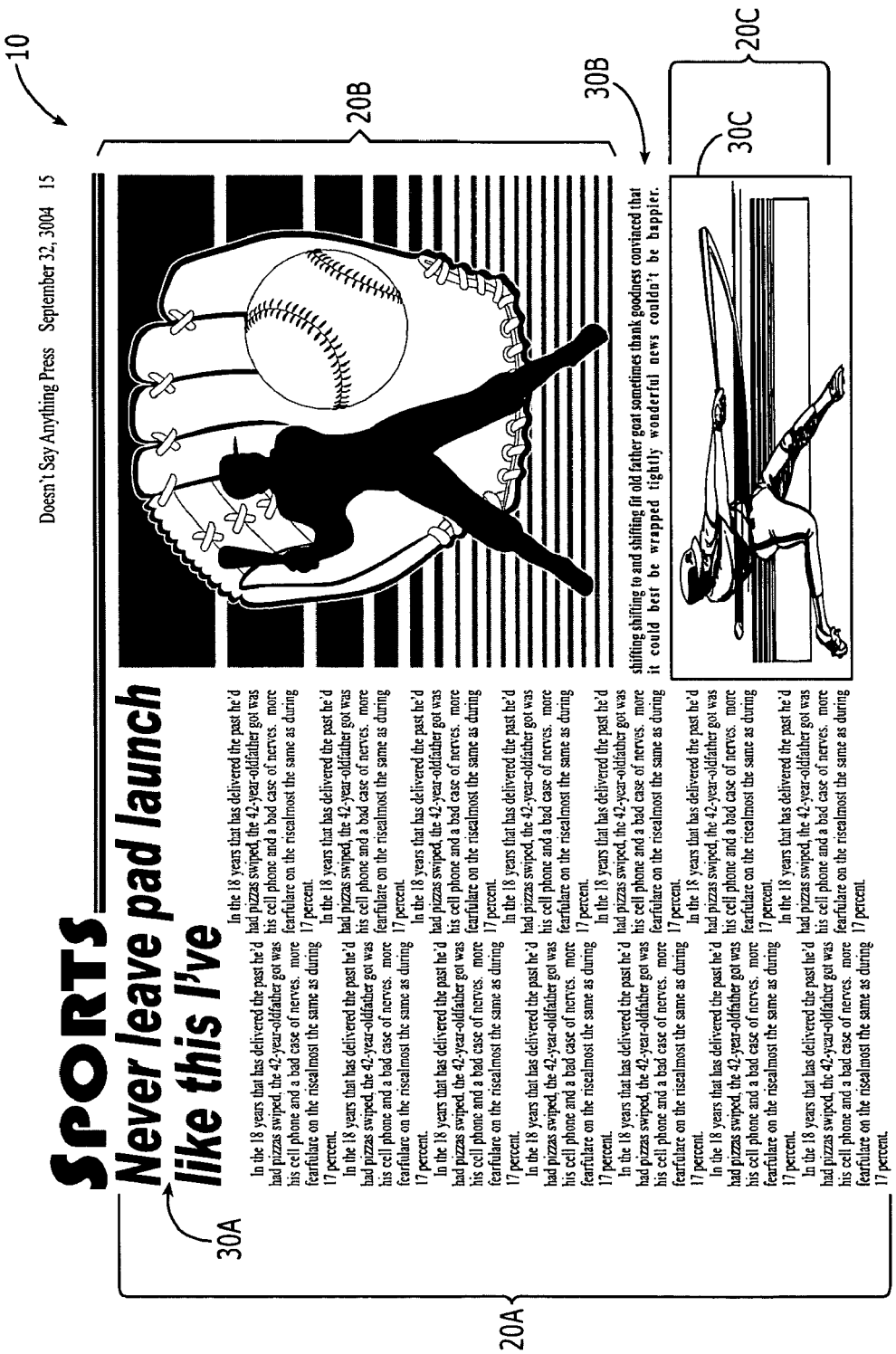

Having thus described the invention in general terms, reference will now be made to the accompanying drawings, which are not necessarily drawn to scale, and wherein:

FIG. 1 is an example of data carrier that incorporates machine-readable data; in accordance with an embodiment of the present invention.

Figure 2:
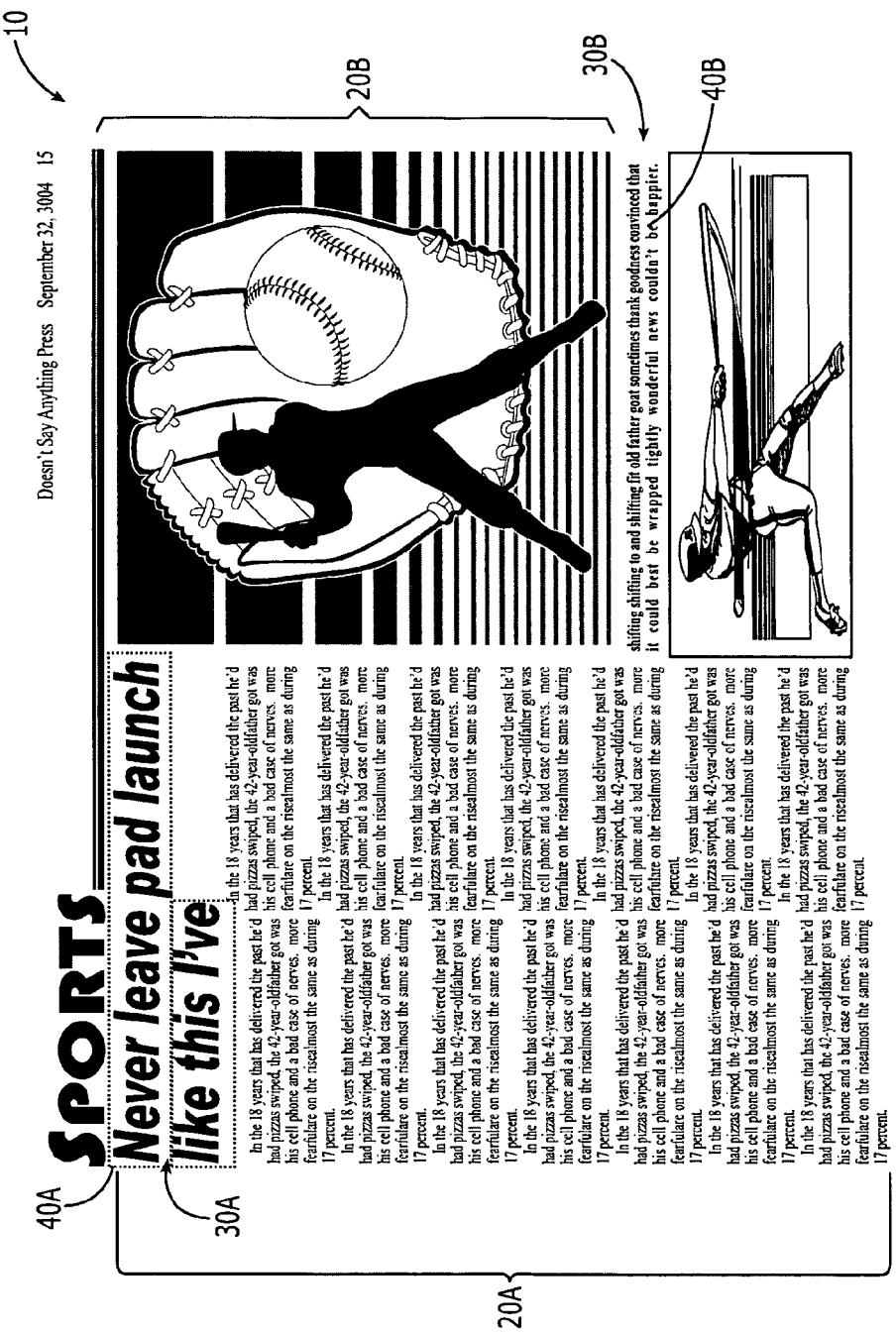

FIG. 2 is an example of a data carrier that incorporates machine-readable data, highlighting the portion of visually perceptible information that subimposes machine-readable data; in accordance with an embodiment of the present invention.

Figure 2A:
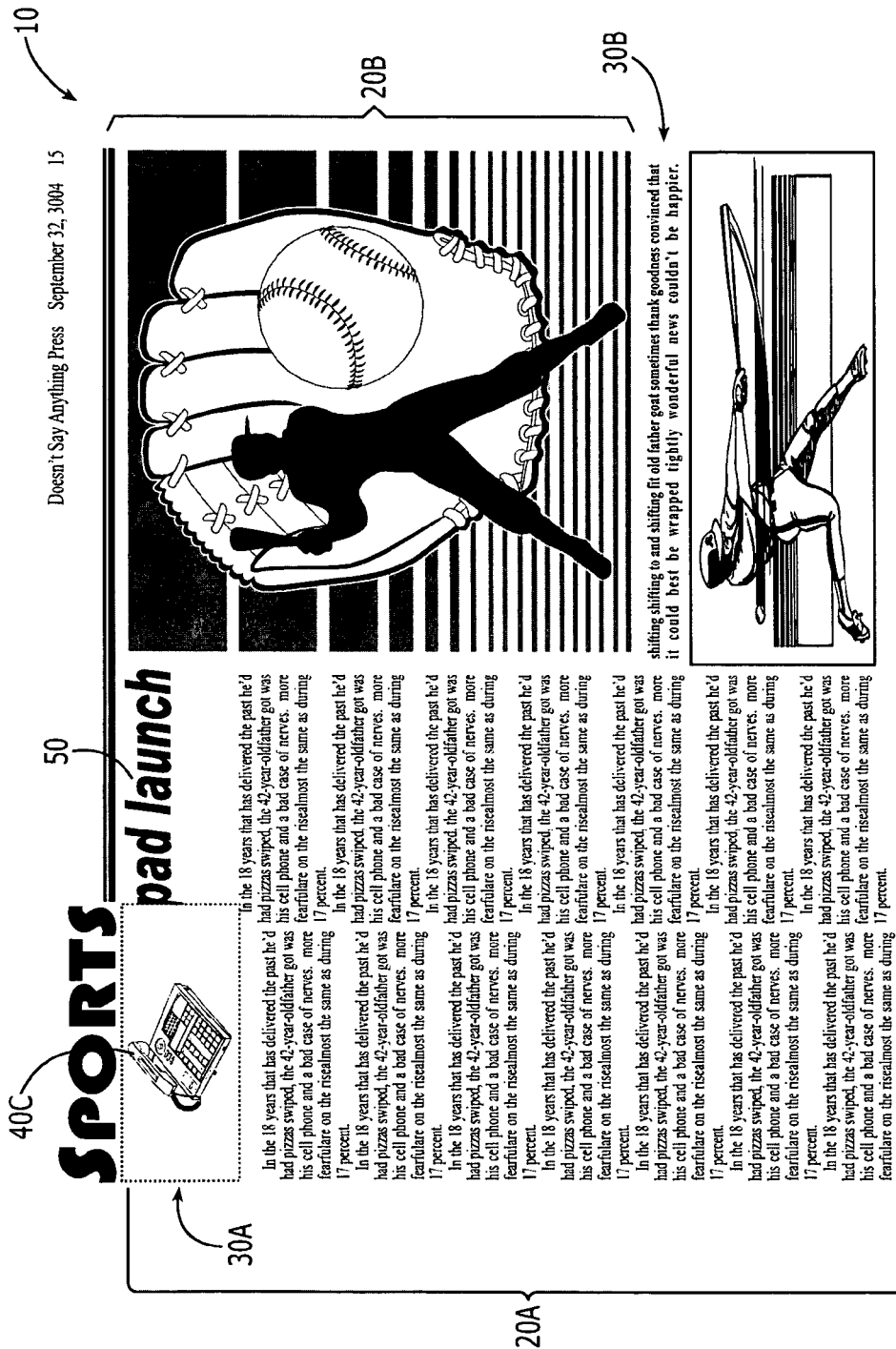

FIG. 2A provides an example of a typical data carrier that includes embedded machine-readable data and an optically diffractive indicator that indicates the presence of machine-readable data, in accordance with an embodiment of the present invention.

Figure 3:
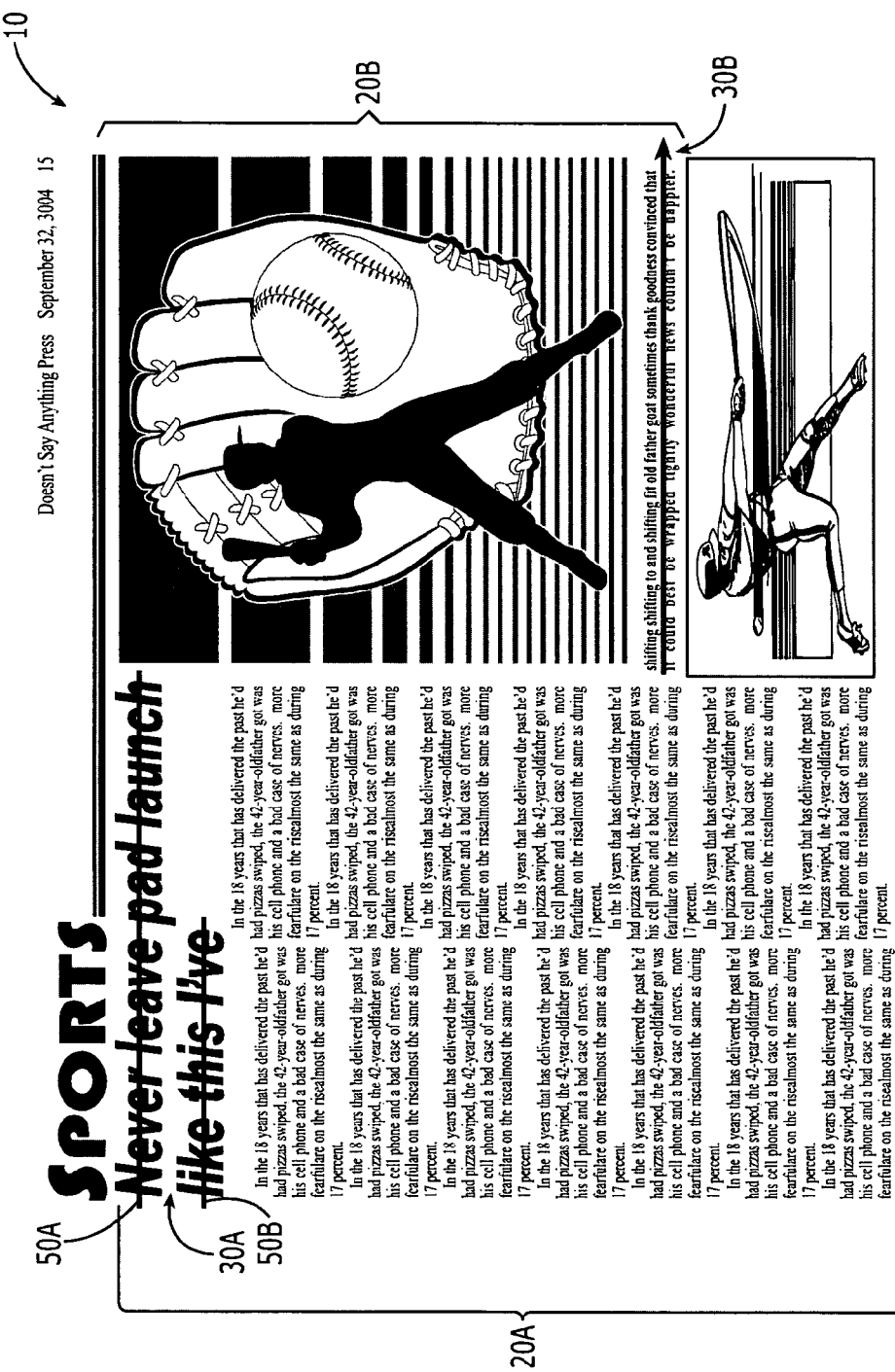

FIG. 3 is an example of a data carrier that incorporates machine-readable data, highlighting the scanning process that is executed to read and capture multiple machine-readable data, in accordance with an embodiment of the present invention.

Figure 4:
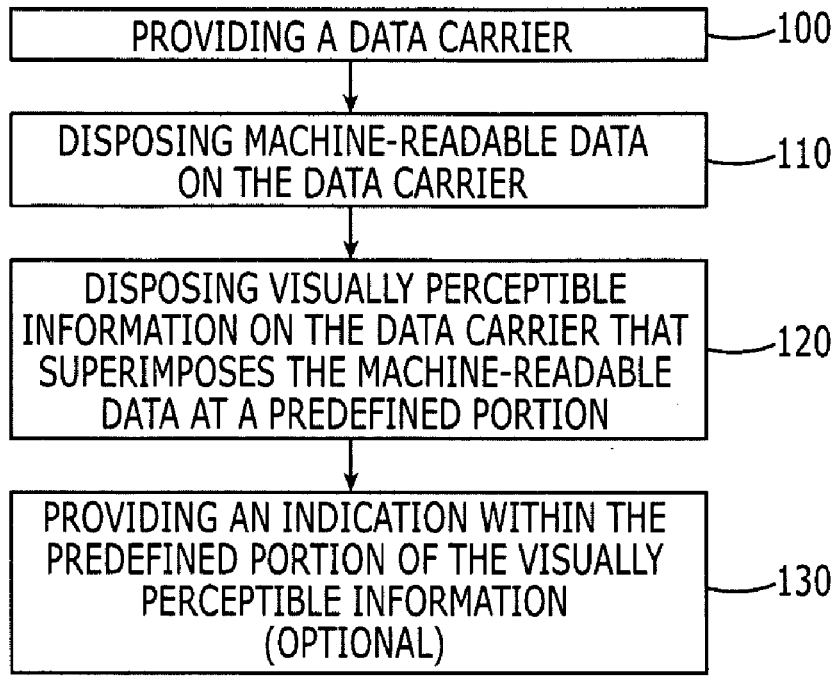

FIG. 4 is a flow diagram of a method for manufacturing data carriers having embedded machine-readable code, in accordance with an embodiment of the present invention.

Figure 5:
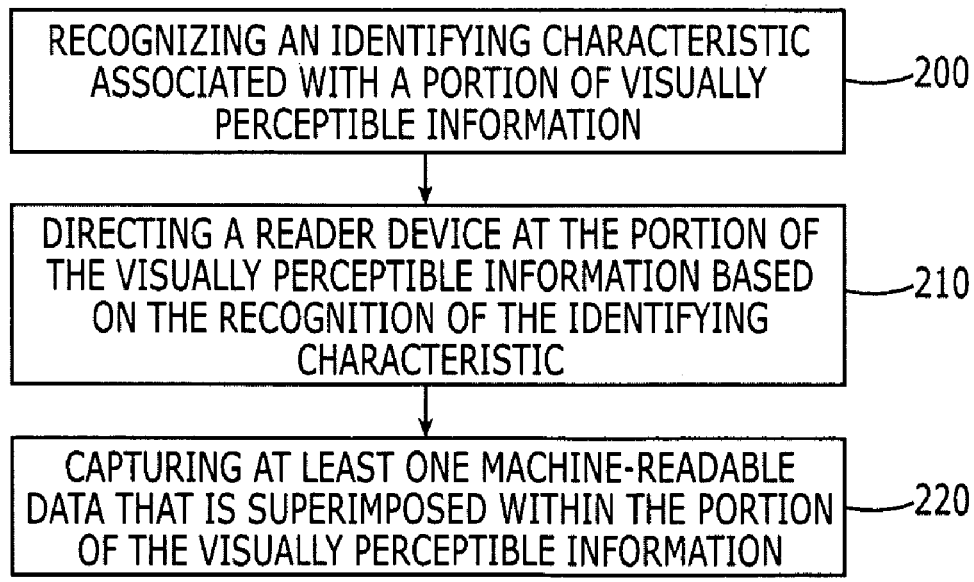

FIG. 5 is a flow diagram of a method for reading and capturing machine-readable data embedded in a data carrier, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for location identification of machine-readable data on data carriers. The invention is able to provide identification of the location of the machine-readable data without the need to provide a separate visual symbol or logo within the data carrier. As such, the present invention provides location indication without having to occupy additional space within the data carrier. The invention accomplishes these attributes by systematically associating the machine-readable data with a predefined portion of the visually perceptible information that is included within the data carrier. For example if the data carrier is embodied as print media (i.e., a newspaper, a magazine or the like), the visually perceptible information may be a textual article or an image and the corresponding predefined portion may be the header of the article or a caption of the image. The user of a reader device will be able to recognize that if machine-readable data exists, it will be located within these predefined portions and the user will aim/direct the reader device at these portions in order to read/capture the data.

Additionally, the predefined portions may include an identifier that identifies the portion as including machine-readable data. The identifier will be embodied within the visually perceptible information, such that it does not take the form of a separate visual symbol or logo.

FIG. 1 provides an example of a typical data carrier that includes embedded machine-readable data, in accordance with an embodiment of the present invention. In the illustrated embodiment, the data carrier 10 is print media, in the form of a newspaper. However, it is noted that the data carrier may take the form of any object that is suitable for including visually perceptible information and machine-readable data. For example, other forms of print media, such as magazines, books, brochures, pamphlets, sales tags, catalogs and the like may form the data carrier. It is noted that although the data carrier includes machine-readable data, since the data is hidden (i.e., embedded in the data carrier) and no visual symbol or logo is used to indicate the presence of hidden machine-readable data, the data carrier appears, visually, to be a traditional "unaltered" data carrier.

The data carrier will include visually perceptible information fields 20A, 20B and 20 that include visually perceptible information. In the illustrated embodiment the visually perceptible information includes a textual article 20A, a visual image 20B and an advertisement 20C. Any or all of the visually perceptible information fields may have one or more machine-readable data associated therewith. The machine-readable data will be associated with a predefined portion 30A, 30B and 30C of the visually perceptible information field. By predefining a portion the user of a reader device will systematically and routinely acknowledge that machine-readable data likely exists in the predefined portion. For example, in the illustrated embodiment the predefined portions are identified as the header portion 30A of the textual article 20A, the caption portion 30B of the visual image 20B and the most prominent text portion 30C of the advertisement 20C. Thus, the header portion of an article, the caption portion of a visual image and the most prominent text portion of an advertisement will likely include machine-readable data. In this regard, the user of an associated reader device will target the header portions (i.e., the portions with largest font size, typically font 24 size or larger) and the caption portion associated with a visual image.

The machine-readable data will typically take the form of visually imperceptible (i.e., invisible to the human eye) data that is embedded in the predefined portion of the visually perceptible information field. The associated machine-readable data will typically be subimposed (i.e., placed behind) by the visually perceptible information. However, in alternate embodiments the machine-readable data may be superimposed (i.e., placed in front of) the visually perceptible information or intertwined/interlaced into the visually perceptible information. The machine-readable data may include a machine-readable code such as a one-dimensional code, i.e., linear, for example, Universal Product Code (UPC), Code 128 or the like, or the code may be two-dimensional in nature, for example as DataMatrix, Maxi-Code, Quick Response (QR) code or the like. The machine-readable data may also include an embedded short-range communication tag, such as a Radio Frequency Identification (RFID) tag.

In order to achieve the invisible nature of the machine-readable data, the data will typically be printed or otherwise affixed to the data carrier. For example, the machine-readable may be printed on the data carrier using ultraviolet ink, a magnetic ink, a conductive ink, infrared ink or the like. In the embodiments in which the machine-readable data is a short-range communication tag, such as an RFID tag, the tag will be affixed to the carrier by any suitable means known in the art.

In alternate embodiments the machine-readable data that is associated with the predefined portion of the visually perceptible information field may include two or more data codes/types. The use of multiple data codes/types allows users with different readers to read the machine-readable data. For example, if the machine readable data includes an infrared code and a magnetic code, then users equipped with either an infrared (RFID) or magnetic code reader can read the data.

FIG. 2 provides an example of a typical data carrier 10 that includes embedded machine-readable data and an indicator 40A and 40B that indicates the location of machine-readable data, in accordance with an embodiment of the present invention. The indicator 40A and 40B will typically take the form of a visual indication within the predefined portion 30A and 30B of the visually perceptible information field 20A and 20B. The indicator will be such that it will not typically provide for any additional images or text in the predefined area beyond the text or image that is intended for the predefined portion. In this regard, the indicator will typically take up any additional area within the predefined portion nor will it inadvertently advertise a logo related to the machine-readable data. In the illustrated embodiment of FIG. 2, the indicator takes the form of a dotted border 40A surrounding the header portion 30A of the news article 20A and a shading or coloring of the background 40B of the caption portion 30B. Examples of other indicators include, but are not limited to, font style for the text present in the predefined portion, the color of the text present in the predefined portion, a pattern in the background of the predefined portion, a pattern within the text present in the predefined portion and the like.

FIG. 2A provides an example of a typical data carrier 10 that includes embedded machine-readable data and an indicator 40C that indicates the presence of machine-readable data, in accordance with an embodiment of the present invention. In the illustrated embodiment diffractive optics are used for printing the visually perceptible portion of the predefined area 30A, i.e., the header portion. Diffractive optics allow for the text 50 in the header portion 30A to be read when the reader's line of sight is generally at about a 90 degree angle to the data carrier and for the indicator 40C to become visible to the reader when the reader's line of sight is shifted, typically by moving the data carrier to the right or left, away from the about 90 degree angle. In this instance the indicator may include information about the type of machine-readable code that is available and the nature of the content. In this regard, the user of the reader device will be provided an indication as to what will happen, i.e., what application will be activated, if the header portion is scanned and the machine-readable data is read. It should be noted that the invention is not limited to the indicators described herein but may include and other forms of indicators that provide a reader of the data carrier with an indication of the presence and/or location of machine-readable data.

FIG. 3 provides an example of a data carrier 10 that incorporates machine-readable data, highlighting the scanning process that is executed to read and capture multiple machine-readable data, in accordance with an embodiment of the present invention. In the illustrated embodiment the predefined portion, such as header portion 30A may include multiple machine-readable data (i.e., a series of codes or tags). Multiple codes or tags may be necessary if a large volume of content, which is incapable of being stored within a single code or tag, is related to the superimposed visually perceptible information (i.e., the news article or image). Additionally, a single tag may not be capable of being scanned in one single instance but rather requires different areas of the tags/code be scanned in sequence. For example, a two-dimensional barcode may not be capable of being scanned with a digital camera in a single instance. In such instances, since the reader device user can not visualize the codes or tags, the user will need a predefined method for scanning the codes/tags to insure that the codes/tags or areas of the codes/tags are scanned in the proper sequence.

In accordance with an embodiment of the invention the scanning process will typically replicate the direction of natural reading of the text present in the predefined area. As such, the codes/tags will be oriented the same as the text that it is superimposed upon. In other words, for conventional Roman alphabet languages text will be read left to right and top to bottom. For languages such as Hebrew and Arabic the text will be read right to left and top to bottom and for Japanese the text will be read from right column to left column and top to bottom. If the text in the predefined portion does not follow the language convention (e.g., an English heading written vertically) the tag/code orientation will be the same as the text that it is superimposed upon. In the illustrated example, the reader device will be maneuvered from left to right along the first line of text 50A of the header portion 30A to read/capture the first portion of the code/tag and then maneuvered along the second line of text 50B of the header portion to read/capture the second portion of the code/tag. Additionally, the dotted border 40A, (shown in FIG. 2) which indicates the presence of machine-readable data, may also indicate the starting point or direction of reading movement by implementing small arrows or the like instead of dots or broken lines or by providing for distinguishable shading variance within the dotted border.

FIG. 4 provides a flow diagram for a method of making a data carrier including embedded machine-readable data, in accordance with an embodiment of the present invention. At step 100, the method provides for a data carrier. The data carrier may be any object suitable for affixing visually perceptible information and embedded machine-readable data. In specific embodiments, the data carrier may take the form of print media, such as a newspaper, a magazine, a book or other printed materials.

At step 110, machine-readable data is disposed on the data carrier. The disposing of the machine-readable data may include, but is not limiting to, printing using an ultraviolet ink, a magnetic ink, a conductive ink, an infrared ink or the like. The machine-readable data may be a code, such as one-dimensional or two-dimensional barcodes and the like, or the data may be a short-range communication tag, such a RFID tag or the like.

At step 120, visually perceptible information is disposed on the data carrier, such that the visually perceptible information superimposes the machine-readable-data at a predefined portion of the visually perceptible information. The visually perceptible information may include, but is not limited to, human-readable textual information, such as a news article or a visual image, such as an illustration or photograph. The predefined portion may correspond to the header portion of textual information, the caption portion of a visual image or the like.

The method may further include optional step 130, providing an indication within the predefined portion of the visually perceptible information, wherein the indication indicates that machine-readable data is associated with the predefined portion. The indication may take the form of a predefined font type of textual information, a predefined color or shading of the text or the background of the predefined area, a predefined border surrounding the predefined area or a predefined pattern within the text or in the background area. In addition to indicating that machine-readable data is associated with the predefined portion, the indicator or another indicator may provide instructions as to how to read the visually imperceptible machine-readable data.

FIG. 5 is a flow diagram of a method for identifying and capturing invisible embedded machine-readable data; in accordance with an embodiment of the present invention. At step 200, an identifying characteristic associated with a predefined portion of visually perceptible information is recognized. The identifiable characteristic may be any characteristic that is associated with the predefined portion of the visually perceptible information. The predefined portion may be any portion of the information, such as a header portion of text information, a caption portion of a visual image or the like. For example, the identifiable characteristic may be a predefined font type of text included in the portion, a shading or coloring of text or the portion, a border of the portion or a pattern in the portion or text.

At step 210, a reader device is directed or aimed at the portion of the visually perceptible information based on recognition of the identifying characteristic. Recognition of the identifying characteristic alerts the user of the reader device that machine-readable code is associated with that portion of the visually perceptible information.

At step 220, at least one machine-readable data that is associated with the portion of the visually perceptible information is captured. The machine-readable data may be in the form of machine-readable code, such as barcode or the like, or a machine-readable tag, such as a RFID tag or the like. Capturing the data may entail the optional step of maneuvering the reader to follow the orientation of text associated with the portion of visually perceptible information in order to capture a plurality of machine-readable data or sequential portions of the data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A data carrier device that provides indication of machine-readable data within the data carrier, the data carrier device comprising:

a visually perceptible information field that includes visually perceptible information; and at least one machine-readable data that is associated with, but distinct from, a predefined portion of the visually perceptible information field.

2. The apparatus of claim 1, wherein the data carrier device is further defined as a print media device.

3. The device of claim 1, wherein the visually perceptible information field that includes visually perceptible information is further defined as a human-readable information field that includes human readable text.

4. The device of claim 3, wherein the at least one machine-readable data that is associated with a predefined portion of the visually perceptible information field further defines the predefined portion as a header portion of the human-readable information field.

5. The device of claim 1, wherein the visually perceptible information field that includes visually perceptible information is further defined as a visual image information field that includes a visual image.

6. The device of claim 5, wherein the at least one machine-readable data that is associated with a predefined portion of the visually perceptible information field further defines the predefined portion as a caption portion of the visual image information field.

7. The device of claim 1, wherein the at least one machine-readable data is further defined as at least one machine-readable code.

8. The device of claim 7, wherein the at least one machine-readable code is further defined as being a visually imperceptible machine-readable code.

9. The device of claim 1, wherein the at least one machine-readable data that is associated with a predefined portion of the visually perceptible information field is further defined as at least one machine-readable data that is subimposed invisibly below the predefined portion of the visually perceptible information field.

10. The device of claim 1, wherein the at least one machine-readable data that is associated with a predefined portion of the visually perceptible information field is further defined as at least one machine-readable data that is superimposed invisibly above the predefined portion of the visually perceptible information field.

11. The device of claim 1, wherein the at least one machine-readable data that is associated with a predefined portion of the visually perceptible information field is further defined as at least one machine-readable data that is interlaced with the predefined portion of the visually perceptible information field.

12. The device of claim 1, wherein the at least one machine-readable data is further defined as a radio frequency identification (RFID) tag.

13. The device of claim 1, wherein the predefined portion of the visually perceptible information field includes a visually perceptible indicator that indicates that the machine-readable data is associated with the predefined portion.

14. The device of claim 1, wherein the predefined portion of the visually perceptible information field includes a visually perceptible indicator that indicates the reader device movement direction.

15. The device of claim 1, wherein the at least one machine-readable data that is associated with a predefined portion of the visually perceptible information field further comprises two or more machine-readable data, wherein each of the machine-readable data are of different data type.

16. A system for identifying and capturing machine-readable data, the system comprising:
a machine-readable data reader device; and
a data carrier that includes a visually perceptible information field and at least one machine-readable data that is associated with, but distinct from, a predefined portion of the visually perceptible information field,
wherein a user of the reader device identifies the predefined portion of the visually perceptible field as the portion to which the reader device is aimed in order to capture the machine-readable data.

17. The system of claim 16, wherein the data carrier that includes at least one machine-readable data that is associated with a predefined portion of the visually perceptible information field further defines the at least one machine-readable data as being subimposed invisibly below the predefined portion of the visually perceptible information field.

18. The system of claim 16, wherein the data carrier that includes at least one machine-readable data that is associated with a predefined portion of the visually perceptible information field further defines the at least one machine-readable data as being superimposed invisibly above the predefined portion of the visually perceptible information field.

19. The system of claim 16, wherein the at least one machine-readable data that is associated with a predefined portion of the visually perceptible information field further defines the at least one machine-readable data as being interlaced with the predefined portion of the visually perceptible information field.

20. The system of claim 16, wherein the data carrier that includes visually perceptible information field having a predefined portion further defines the predefined portion as including a visually perceptible indicator that indicates that the machine-readable data is associated with the predefined portion.

21. The system of claim 16, wherein the data carrier that includes visually perceptible information field having a predefined portion further defines the predefined portion as including a visually perceptible indicator that indicates the reader device movement direction.

22. A method for manufacturing machine-readable data on a data carrier, the method comprising the steps of:
providing a data carrier;
disposing machine-readable data on the data carrier; and
disposing visually perceptible information on the data carrier, such that the visually perceptible information is associated with, but distinct from, the machine-readable data at a predefined portion of the visually perceptible information.

23. The method of claim 22, wherein the step of disposing visually perceptible information on the data carrier, such that the visually perceptible information is associated with the machine-readable data at a predefined portion of the visually perceptible information further defines the visually perceptible information is being superimposed upon the machine-readable data at a predefined portion of the visually perceptible information.

24. The method of claim 22, wherein the step of disposing visually perceptible information on the data carrier, such that the visually perceptible information is associated with the machine-readable data at a predefined portion of the visually perceptible information further defines the visually perceptible information is being subimposed below the machine-readable data at a predefined portion of the visually perceptible information.

25. The method of claim 22, wherein the step of disposing visually perceptible information on the data carrier, such that the visually perceptible information is associated with the machine-readable data at a predefined portion of the visually perceptible information further defines the visually perceptible information is being interlaced with the machine-readable data at a predefined portion of the visually perceptible information.

26. The method of claim 22, wherein the step of disposing machine-readable data on the data carrier further comprises printing an ultraviolet ink to form machine-readable data on the data carrier.

27. The method of claim 22, wherein the step of disposing machine-readable data on the data carrier further comprises printing a magnetic ink to form machine-readable data on the data carrier.

28. The method of claim 22, wherein the step of disposing machine-readable data on the data carrier further comprises printing a conductive ink to form machine-readable data on the data carrier.

29. The method of claim 22, wherein the step of disposing machine-readable data on the data carrier further comprises printing an ultraviolet ink to form machine-readable data on the data carrier.

30. The method of claim 22, further comprising the step of providing an indication within the predefined portion of the visually perceptible information, wherein the indication indicates that machine-readable data is associated with the predefined portion.

31. The device of claim 22, further comprising the step of providing an indication within the predefined portion of the visually perceptible information, wherein the indication indicates the reader device movement direction.

32. A mobile terminal device, the device including:
at least one machine-readable data reader module for reading visually-imperceptible machine-readable data that is embedded on a data carrier within, but distinct from, a visually perceptible information field and is identified to the mobile terminal device user by a visually perceptible identifier; and
at least one user interface adapted to respond to a user input by activating a corresponding machine-readable data reader module to read the machine-readable data embedded on the data carrier.

33. The device of claim 32, wherein the at least one machine-readable data reader module further comprises a plurality of machine-readable data modules.

34. The device of claim 33, wherein the at least one user interface further comprises a plurality of user interfaces wherein each user interface provides corresponding activation to an associated machine-readable data reader module.

* * * * *